United States Patent [19]

Perino et al.

[11] Patent Number: 6,005,895
[45] Date of Patent: Dec. 21, 1999

[54] APPARATUS AND METHOD FOR MULTILEVEL SIGNALING

[75] Inventors: Donald V. Perino, Los Altos; John B. Dillon, Palo Alto, both of Calif.

[73] Assignee: Rambus Inc., Mountain View, Calif.

[21] Appl. No.: 08/772,175

[22] Filed: Dec. 20, 1996

[51] Int. Cl.[6] ............................. H04L 25/34; H04L 25/49
[52] U.S. Cl. ............................. 375/288; 375/257; 341/56
[58] Field of Search ................................. 375/257, 286, 375/288; 327/50; 341/56

[56] References Cited

U.S. PATENT DOCUMENTS

| | | |
|---|---|---|
| 3,671,671 | 6/1972 | Watanabe . |
| 3,731,199 | 5/1973 | Tazaki et al. . |
| 3,835,252 | 9/1974 | Ananiades et al. . |
| 3,943,284 | 3/1976 | Nelson . |
| 3,983,323 | 9/1976 | Griffith et al. . |
| 4,280,221 | 7/1981 | Chun et al. ............................. 375/288 |
| 4,525,845 | 7/1985 | Dodds et al. . |
| 4,581,691 | 4/1986 | Hock . |
| 4,825,450 | 4/1989 | Herzog ................................... 375/288 |
| 5,160,929 | 11/1992 | Costello . |
| 5,172,338 | 12/1992 | Mehrotra et al. ....................... 365/185 |
| 5,235,617 | 8/1993 | Mallard, Jr. . |
| 5,255,287 | 10/1993 | Davies et al. . |
| 5,259,002 | 11/1993 | Carlstedt ................................ 375/288 |
| 5,341,419 | 8/1994 | Ferry . |
| 5,412,689 | 5/1995 | Chan et al. . |
| 5,418,504 | 5/1995 | Nottenburg . |
| 5,553,097 | 9/1996 | Dagher ................................... 375/240 |
| 5,566,125 | 10/1996 | Fazio et al. ............................. 365/45 |
| 5,761,246 | 6/1998 | Cao et al. ............................... 375/288 |

FOREIGN PATENT DOCUMENTS

| | | |
|---|---|---|
| 0352869 | 7/1989 | European Pat. Off. . |
| 2940140 | 3/1979 | Germany . |

OTHER PUBLICATIONS

Clayton R. Paul, Prediction of Crosstalk in Ribbon Cables: Comparison of Model Predictions and Experimental Results, IEEE Transactions on Electromagnetic Compatibility, vol. EMC–20, No. 3, Aug. 1978, pp. 394–406.

Propagation Over Multiple Parallel Transmission Lines Via Modes, IBM Technical Disclosure Bulletin, vol. 32, No. 11, Apr. 1990, pp. 1–6.

International Search Report–Sep. 22, 1998–International Application No.: PCT/US 97/23276.

PCT International Application Published Under PCT–International Publication No.: WO 95/31867, International Publication Date: Nov. 23, 1995.

Scott, "Propagation Over Multiple Parallel Transmission Lines Via Modes", IBM Technical Disclosure Bulletin, Apr. 1990. pp. 1–6.

Richard E. Matick, "Transmission Lines for Digital and Communication Networks", IEEE Press, 1995, pp. 268–269.

*Primary Examiner*—Chi H. Pham
*Assistant Examiner*—Bryan Webster
*Attorney, Agent, or Firm*—Blakely, Sokoloff, Taylor & Zafman LLP

[57] ABSTRACT

A system for transmitting information from a source to a destination using multilevel signaling. Multiple conductors are coupled between the transmission source and the transmission destination. Multiple drivers are coupled to the conductors at the transmission source. Each driver is coupled to a pair of conductors. Multiple comparators are coupled to the conductors at the transmission destination. Each comparator is coupled to a pair of conductors. The information is encoded into a sequence of symbols in which each symbol represents a unique permutation of signal levels on the conductors. Each signal level is used at least once for each symbol. All signal levels associated with a particular symbol are transmitted over the conductors simultaneously.

23 Claims, 9 Drawing Sheets

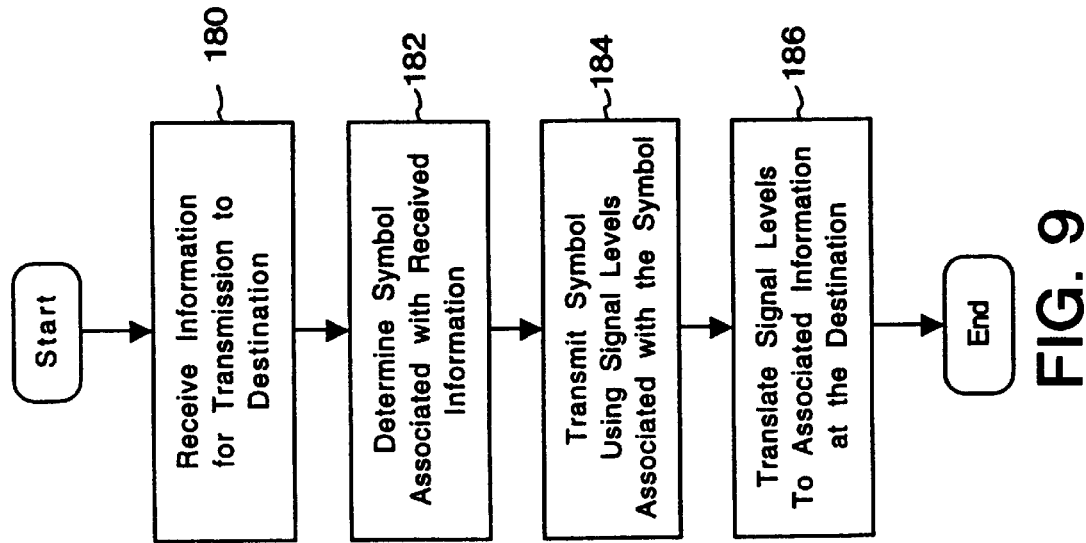
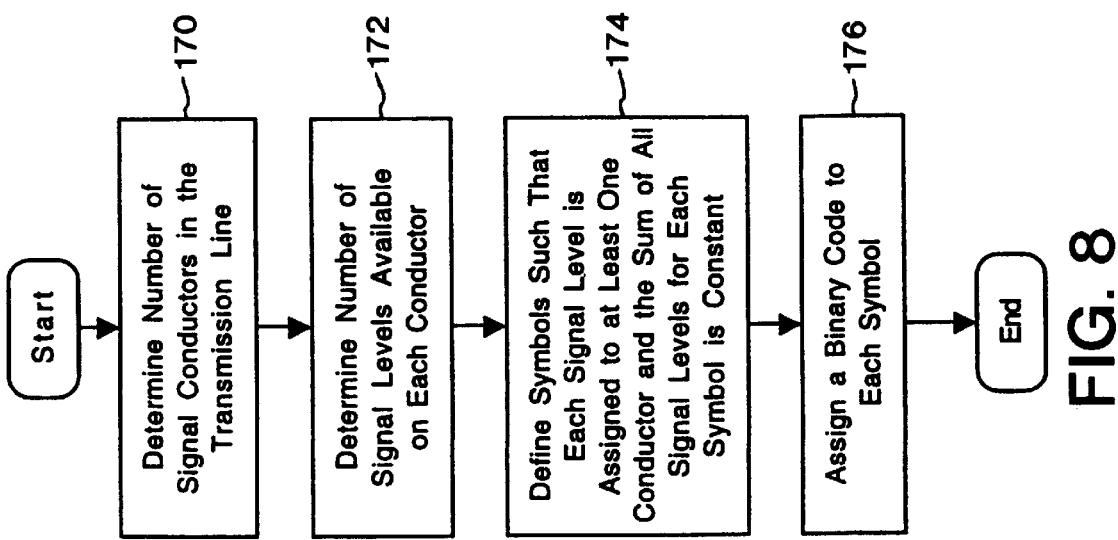

APPARATUS AND METHOD FOR MULTILEVEL SIGNALING

BACKGROUND OF THE INVENTION

1. Field of the Invention

The present invention relates to a multilevel signaling system for transmitting signals across a multiconductor transmission line.

2. Background

Various techniques and systems are available for transmitting data between a source and a destination. When data is electrically transmitted across a conductor, a particular signaling technology or protocol is utilized. A set of symbols may be associated with specific signaling technologies. The symbols are used to encode the data into various electrical patterns on the transmission line conductors such that each symbol may be distinguished from other signals by analyzing the electrical pattern on the conductors. The conductors used to transmit data include wires, cables, traces on printed circuit boards, conductors embedded within a substrate, and various other conductive materials.

In certain data transmission systems, the conductors are treated as transmission lines and analyzed by considering various electrical and electromagnetic wave properties and characteristics. In these systems, the signaling technology may include the coupling of signal drivers, signal receivers, conductors, and termination devices.

A particular type of data transmission system transmits signals differentially. For example, FIG. 1 illustrates a known differential transmission system using a pair of conductors. A differential driver 10 receives data on input 12 and transmits differential signals across conductors 14 and 16. Conductor 14 is coupled to the non-inverting output of driver 10 and conductor 16 is coupled to the inverting output of driver 10. A differential receiver 18 (also referred to as a differential comparator) receives the differential signals from conductors 14 and 16, and generates an output on line 20. Conductor 14 is coupled to the non-inverting input of receiver 18 and conductor 16 is coupled to the inverting input of receiver 18. A pair of terminating resistors 22, 24 are coupled between conductors 14 and 16, and a terminating voltage $V_{term}$.

In the system of FIG. 1, the pair of conductors 14, 16 are capable of transmitting two symbols representing a binary zero or binary one. The data provided to driver 10 represents one of two possible symbols; e.g., a binary zero or one. Driver 10 transmits a particular signal pattern on conductors 14, 16 based on the input data provided to the driver. For example, when a binary zero is the input data, driver 10 generates a logic low signal on its non-inverting output which is coupled to conductor 14. Driver 10 also generates a logic high signal on its inverting output which is coupled to conductor 16. Conversely, when a binary one is the input data, driver 10 generates a logic high signal on its non-inverting output and generates a logic low signal on its inverting output. Thus, the polarity of the outputs from differential driver 10 are always opposite one another. The output polarity is controlled by the input signal applied to driver 10.

Differential driver 10 may be a current mode driver which produces output currents ($i_0$ and $i_1$) in response to the input provided. The value of $v_0$ is defined as $v_0 = V_{term} - i_0 R_r$. Similarly, the value of $v_1$ is defined as $v_1 = V_{term} - i_1 R_r$. Receiver 18 compares the voltage levels on its two inputs and generates the data output signal corresponding to the input provided to driver 10.

The differential signaling system illustrated in FIG. 1 requires two conductors 14, 16 to transmit a single bit of data. Therefore, this method results in an inefficient use of data interconnect resources (number of conductors =2×number of bits transmitted). Certain applications may require a more efficient use of interconnect resources in a differential transmission system. Thus, it is desirable to provide a system having the advantages provided by differential signaling, but without the inefficient ratio of the number of conductors to the number of bits transmitted.

SUMMARY OF THE INVENTION

The present invention provides a multilevel signaling system using multiple conductors for transmitting data from a source to a destination.

An embodiment of the present invention includes at least three conductors coupled between the transmission source and the transmission destination. Multiple drivers are coupled to the conductors at the transmission source. Multiple comparators are coupled to the conductors at the transmission destination. Each comparator is coupled to a pair of conductors.

Another feature of the invention provides that the drivers maintain a constant current on the multiple conductors. The constant current is maintained for all signal patterns transmitted along the conductors.

Each signal pattern generates a linear combination of eigenvectors. A particular embodiment of the invention utilizes linear combinations of equal speed eigenvectors.

Another aspect of the invention includes a first translator coupled to the drivers. The first translator generates control signals for controlling the drivers.

Additionally, a second translator may be coupled to the comparators. The second translator generates an output signal in response to the signals generated by the comparators.

A specific feature of the invention couples multiple comparator inputs such that an "n choose two" combinatorial matrix is generated.

A specific embodiment of the invention provides a substantially symmetrical arrangement of the multiple conductors.

BRIEF DESCRIPTION OF THE DRAWINGS

The present invention is illustrated by way of example in the following drawings in which like references indicate similar elements. The following drawings disclose various embodiments of the present invention for purposes of illustration only and are not intended to limit the scope of the invention.

FIG. 8 is a flow diagram illustrating an embodiment of a procedure for defining a set of symbols transmitted by a particular transmission system.

FIG. 9 is a flow diagram illustrating an embodiment of a procedure for transmitting information from a source to a destination.

DETAILED DESCRIPTION

The following detailed description sets forth numerous specific details to provide a thorough understanding of the invention. However, those skilled in the art will appreciate that the invention may be practiced without these specific details. In other instances, well-known methods, procedures, components, and circuits have not been described in detail so as not to obscure the invention.

The present invention is related to a multilevel signaling system that utilizes multiple transmission lines to transmit information from a source to a destination. Information is transmitted using symbols (or codes) formed from multiple signal levels. A signal level is the physical state of a conductor that can be determined by a detector coupled to the conductor. The symbols are defined such that the sum of the currents flowing on any group of conductors is constant for all symbols.

Two or more possible signal levels are carried by each conductor. These signal levels may, for example, be generated by different currents flowing through the conductors. Different symbols are transmitted across the multiple conductors by using a permutation of the signal levels. For example, three different current values $i_0$, $i_1$, and $i_2$ may be available for any particular conductor. Based on the combination of current values provided on each conductor, a specific symbol is represented. For example, Table 1 below illustrates a symbol set for use with a three-conductor transmission system using three different current values. The transmission system maintains a constant current on the conductors by providing each of the current values on one of the conductors; i.e., current $i_0$ is provided on one conductor, current $i_1$ is provided on another conductor, and current $i_2$ is provided on the remaining conductor. Therefore, the sum of the currents flowing on the conductors for any symbol is $i_0+i_1+i_2$. The use of constant current on the signal conductors reduces ground bounce. Ground bounce is the shift in the ground reference voltage due to output switching. If a terminating voltage is used in a termination network, noise on the voltage in the termination network is reduced, thereby providing a better signal-to-noise ratio in the system.

TABLE 1

| Symbol | $b_1 b_0$ | Current |
| --- | --- | --- |
| A | 00 | $i_0, i_1, i_2$ |
| B | 01 | $i_0, i_2, i_1$ |
| C | 10 | $i_1, i_0, i_2$ |
| D | 11 | $i_2, i_0, i_1$ |
| E |    | $i_1, i_2, i_0$ |
| F |    | $i_2, i_1, i_0$ |

Figure 1:
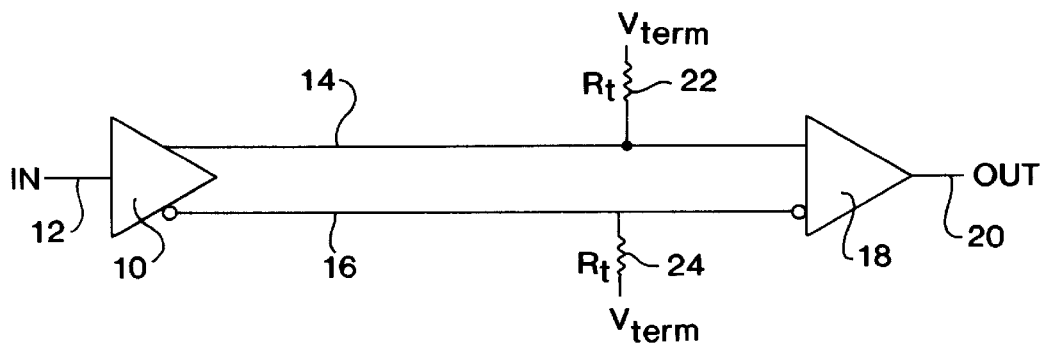
FIG. 1 illustrates a known differential transmission system using a pair of conductors.

As shown in Table 1, three conductors are capable of transmitting six different symbols. In contrast, the known differential transmission system shown in FIG. 1 uses two conductors to transmit two symbols. By adding one additional conductor, the present invention triples the number of symbols that may be transmitted. Thus, the present invention is more efficient with respect to the utilization of interconnection resources.

As shown in Table 1, six different symbols may be used with a three conductor differential transmission system. Although six different symbols are available, a particular embodiment of the three conductor transmission system may utilize only four of the symbols. The four different symbols may be used to transmit two bits of data ($b_1$ and $b_0$). In this embodiment, the remaining two symbols (E and F) are unused.

Figure 2:
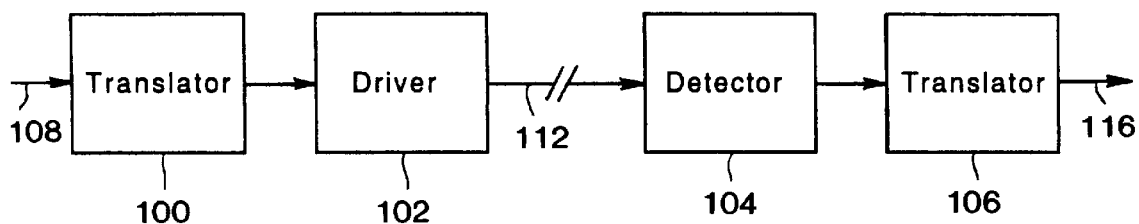
FIG. 2 illustrates an embodiment of a system capable of performing multilevel signaling according to the present invention.

FIG. 2 illustrates an embodiment of a system capable of performing multilevel signaling according to the present invention. This system transmits information from a source to a destination across multiple conductors. A translator 100 is constructed using various logic devices to convert an input signal 108 into a driver control signal for controlling a driver 102. Input signal 108 may represent a symbol or other information to be transmitted from a source to a destination. Driver 102 is controlled by the driver control signal to generate m-ary (e.g., binary, trinary, and the like) signals on a transmission line 112 coupled to driver 102. For example, driver 102 may generate a trinary signal (m=3) on transmission line 112. The variable m identifies the number of possible signal levels on transmission line 112. Thus, a trinary signal has three possible signal levels. Additional details regarding the driver control signal and the generation of m-ary signals are discussed below.

A detector 104 (also referred to as a receiver) is coupled to transmission line 112 and receives the trinary signal generated by driver 102. Detector 104 detects which signal level is on each conductor in transmission line 112 and provides that signal level information to a translator 106. Translator 106 converts the signal level information into a destination code. Translator 106 generates an output 116 indicating the symbol transmitted on transmission line 112. Output 116 matches the input 108, thereby completing the transmission of the information from input 108 to output 116. Although not shown in FIG. 2, transmission line 112 may include a ground conductor (also referred to as a reference conductor).

Although the invention may be used with a transmission line having any number of conductors, specific embodiments of the invention will be discussed by way of example. Specifically, transmission systems using three signal conductors and four signal conductors are illustrated and described. Those of ordinary skill in the art will appreciate that an N+1 conductor transmission line may include N signal conductors and one reference conductor. Thus, a four-conductor transmission line may include three signal conductors and one reference conductor.

Figure 3A:
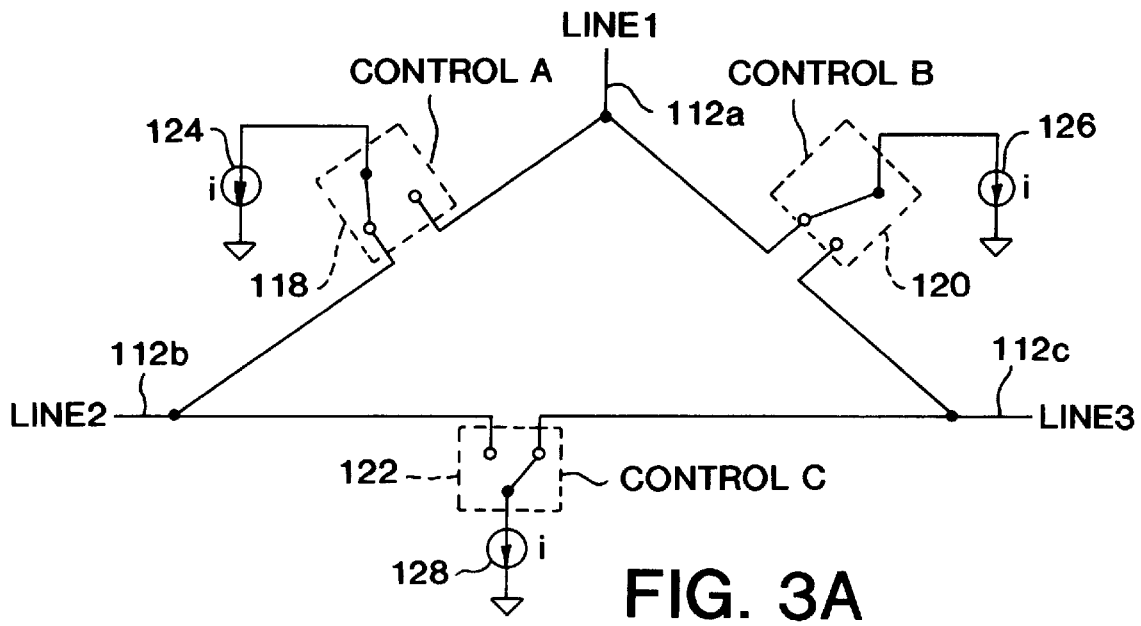
FIG. 3A illustrates an embodiment of a driver for use with a three-conductor transmission line.

FIG. 3A illustrates an embodiment of a driver for use with a transmission line having three signal conductors 112a, 112b, and 112c. Switches 118, 120, and 122 are coupled to current sources 124, 126, and 128, respectively. Each switch 118–122 is coupled to two of the three conductors. Thus, each switch 118–122 is capable of "steering" the current generated by the associated current source 124–128 to one of two conductors. For example, switch 118 steers the current generated by current source 124 to conductor 112a or conductor 112b. The position of each switch 118–122 is determined by a control signal (ControlA, ControlB, or ControlC) generated by translator 100 (shown in FIG. 2). The control signals are generated such that the condition ControlA=ControlB=ControlC never occurs, thereby avoiding the situation where all conductors receive a current of 1i. In the driver of FIG. 3A, one conductor receives current from two current sources (2i), another conductor receives current from one current source (1i), and the remaining conductor receives no current (0i). The various combinations of signal levels are shown in Table 3.

In an embodiment of the invention, each current source 124–128 generates a current i. Thus, depending on the position of switches 118–122, each conductor 112a–112c may carry 0i, 1i, or 2i. When switches 118–122 are in the positions shown in FIG. 3A, each conductor 112a–112c carries 1i. However, if the position of switch 118 is changed, then conductor 112a carries 2i, conductor 112b carries 0i (no current), and conductor 112c carries 1i. Thus, various combinations of currents may be generated on the conductors based on the position of switches 118–122. Note that the condition shown in FIG. 3A (each conductor carrying current 1i) is not actually used because the control signals are generated to avoid this condition.

In the example shown in FIG. 3A, three different signal levels (0i, 1i, and 2i) may be transmitted on each conductor. A set of symbols is created by selecting all permutations of signal levels such that each signal level is used at least once. The set of symbols is created such that the order of duplicate signal levels is not considered as a separate symbol. In this example, there are six permutations of the three signal levels, using each signal level once. The six permutations are illustrated below in Table 2.

TABLE 2

| Symbol | Signal Levels | Sum of Currents |
|--------|---------------|-----------------|
| A | 2i, 1i, 0i | 3i |
| B | 1i, 0i, 2i | 3i |
| C | 2i, 0i, 1i | 3i |
| D | 0i, 2i, 1i | 3i |
| E | 1i, 2i, 0i | 3i |
| F | 0i, 1i, 2i | 3i |

As shown in Table 2, the sum of all signal level currents for each symbol is constant (3i). Since each signal level is used at least once, the transmitted signal levels can be decoded by comparing voltages between all possible pairs of conductors. This comparison is performed by detectors 104 shown in FIG. 2, and discussed below with respect to FIG. 3B.

Table 2 above illustrates the conductor signal levels associated with each symbol A–F. Table 3 below illustrates the control signals generated by translator 100 to control drivers 102. Additionally, Table 3 illustrates the signals generated by detectors 104 in response to the conductor signal levels.

TABLE 3

| Code (Source) | Control Signals | Signal Levels | Symbol | Detector Output | Code (Dest.) |
|---------------|-----------------|---------------|--------|-----------------|--------------|
| 000 | 001 | 2i, 1i, 0i | A | 001 | 000 |
| 001 | 010 | 1i, 0i, 2i | B | 010 | 001 |
| 010 | 011 | 2i, 0i, 1i | C | 011 | 010 |
| 011 | 100 | 0i, 2i, 1i | D | 100 | 011 |
| 100 | 101 | 1i, 2i, 0i | E | 101 | 100 |
| 101 | 110 | 0i, 1i, 2i | F | 110 | 101 |

The columns of Table 3 represent exemplary signals generated at different stages of a transmission system having three signal conductors. Symbols A–F correspond to a particular binary code, as illustrated in column 1. The code in column 1 is generated at the source and provided to the input of translator 100. Translator 100 then generates control signals for controlling the position of switches 118–122 shown in FIG. 3A. The switch positions are controlled such that the signal levels shown in column 3 are provided on the conductors 112a–112c. These signal levels are received by detector 104 and converted into signals corresponding to the control signals shown in column 2. The detector output is then converted by translator 106 into a destination code corresponding to the input code shown in column 1. Thus, the transmission system reproduces the source information at the destination.

Figure 3B:
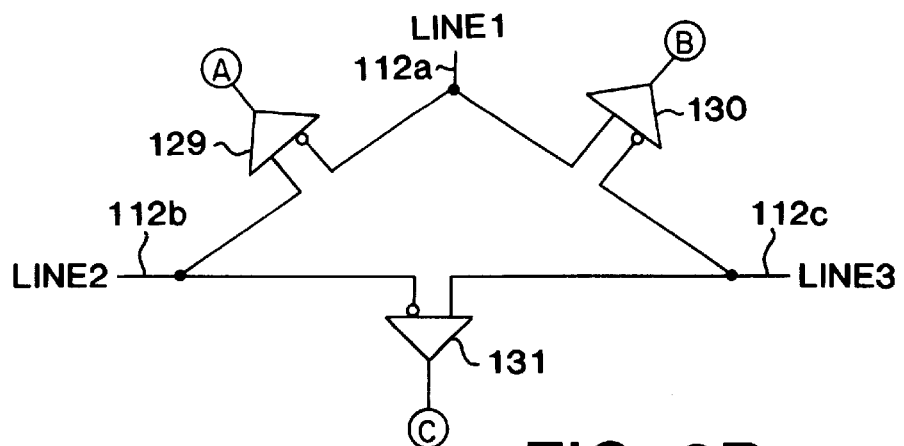
FIG. 3B illustrates an embodiment of a detector for use with a three-conductor transmission line.

FIG. 3B illustrates an embodiment of a detector for use with a transmission line having three signal conductors. Differential comparators 129, 130, and 131 are positioned between each possible pair of conductors 112a–112c. Each comparator 129–131 compares the signal levels on the conductors coupled to the comparator. Since comparators 129–131 determine the difference between two signal levels, a threshold voltage reference is not required. Instead, comparators 129–131 determine the difference between the two signal levels, thereby eliminating the need to determine the actual value or magnitude of the signal level on each conductor. By comparing the two signals, common-mode noise does not interfere with signal recovery because substantially the same noise signal is present on each conductor.

Based on the comparison of signal levels, each comparator 129–131 generates an output signal (labeled A, B, and C, respectively), used by translator 106 (FIG. 2) to generate the proper code or symbol corresponding to the conductor signal levels. The output signal is shown, for example, in column 5 of Table 3.

As illustrated in FIG. 3B, comparators 129–131 are coupled to conductors 112a–112c such that an "n choose two" combinatorial matrix is created; i.e., each possible combination of two conductors is coupled to one of the comparators. Thus, comparators 129–131 are coupled to the "n choose two" combinatorial matrix and perform "pairwise differential comparisons."

Figure 4:
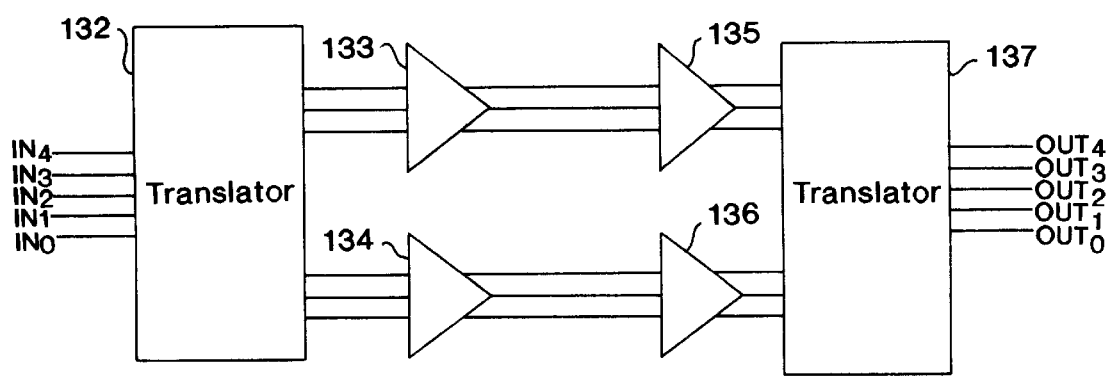
FIG. 4 illustrates another embodiment of the invention utilizing a pair of three-conductor transmission lines.

FIG. 4 illustrates another embodiment of the invention utilizing a pair of transmission lines, each having three conductors, for transmitting data between a source and a destination. Since two different transmission lines are used, each capable of transmitting six symbols, a total of 36 (6×6) symbols may be transmitted. The system of FIG. 4 includes a translator 132 coupled to receive five bits of data ($in_4$–$in_0$). The five bits of data represent 32 different states, thereby using 32 of the 36 possible symbols. Translator 132 generates six different control signals, three of which are provided to a first driver 133 and the remaining three are provided to a second driver 134. Drivers 133 and 134 may be similar to those described above with reference to FIGS. 2, 3A, and 5. Drivers 133 and 134 generate output signals on multiple conductors that are coupled to receivers 135 and 136. As with the drivers, receivers 135 and 136 are similar to those discussed above in FIGS. 2, 3B, and 6. The outputs of receivers 135 and 136 are coupled to a translator 137.

In operation, receivers 135 and 136 generate output signals that are provided to translator 137. Translator 137 generates a five-bit output signal (out$_4$–out$_0$) in response to the signals received from receivers 135 and 136. The five-bit output signal corresponds to the five bit input signal (in$_4$–in$_0$) received by translator 132.

Figure 5:
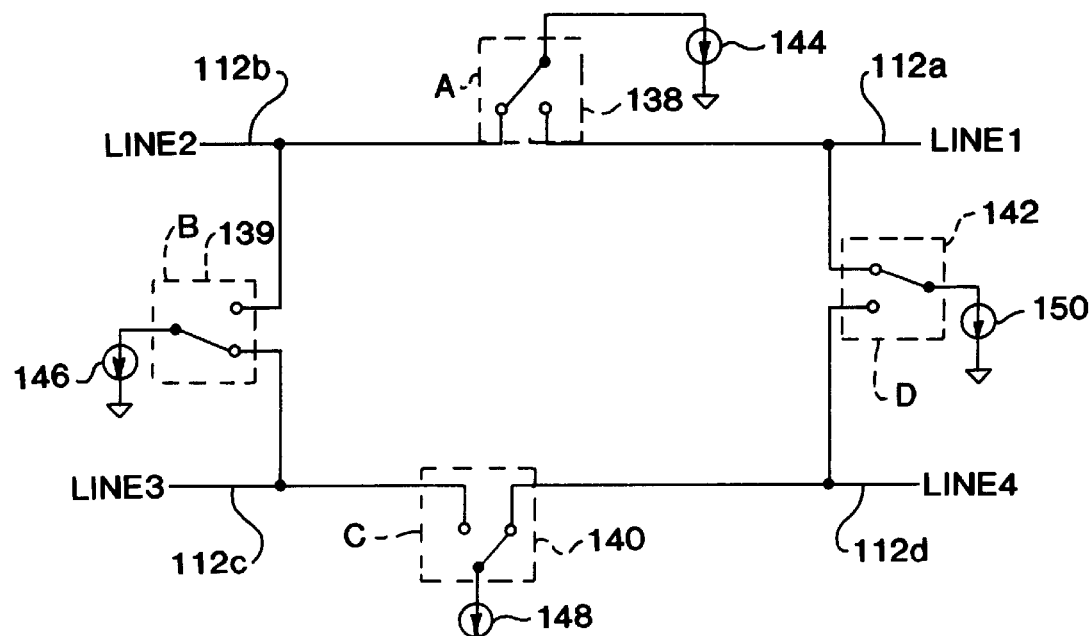
FIG. 5 illustrates an embodiment of a driver for use with a four-conductor transmission line.
Figure 6:
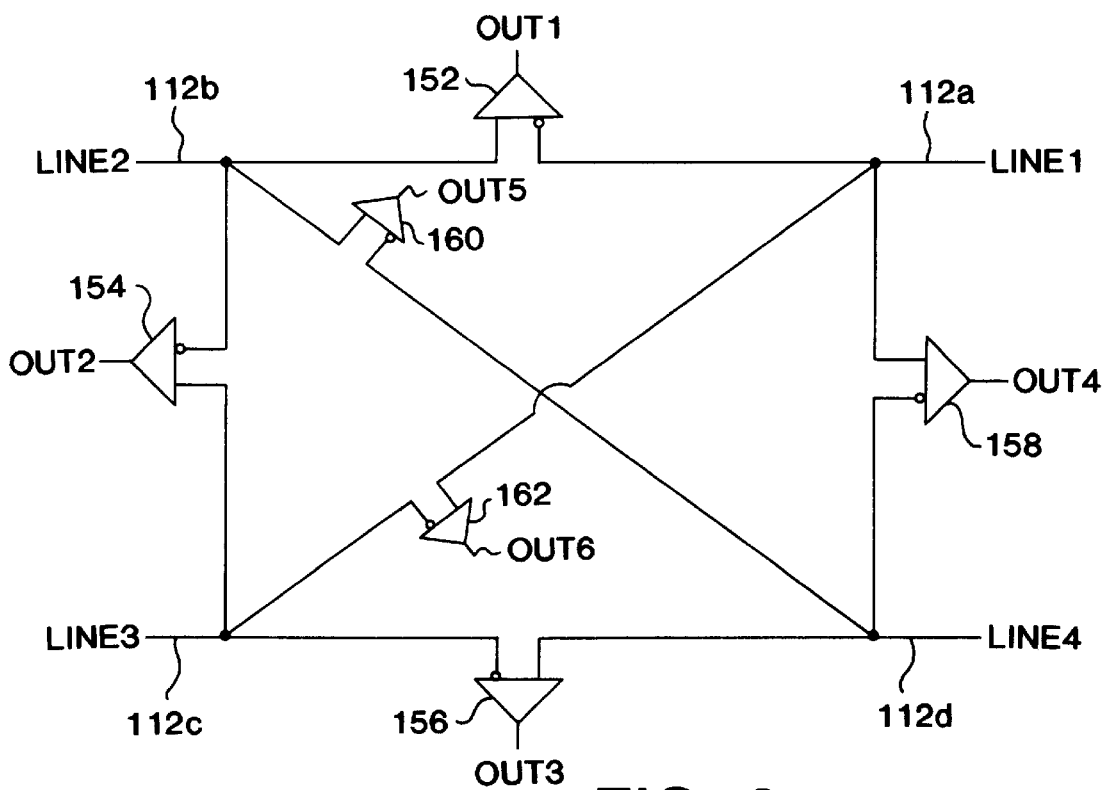
FIG. 6 illustrates an embodiment of a detector for use with a four-conductor transmission line.

FIGS. 5 and 6 illustrate an embodiment of a driver and a detector for use in a transmission system having four signal conductors and three different signal levels. Table 4 below illustrates the twelve symbols available for use with a transmission system of the type shown in FIGS. 5 and 6. Each conductor may carry 0i, 1i or 2i, thereby creating twelve permutations of current values as shown in the third column of Table 4. The number of permutations is determined by the equation:

$$\text{Permutations} = \frac{n!}{p!} = \frac{4!}{2!} = 12$$

In the above equation, n is the number of conductors and p is the number of like-kind repeating symbols. In this example, n=4 (four conductors). Since three signal levels are used, one signal level must be repeated (thus, p=2 because there are two like-kind repeating symbols).

A particular implementation of a transmission system having four signal conductors may use the first eight symbols to transmit three bits of data (b$_2$, b$_1$, b$_0$), leaving the remaining four symbols (I, J, K, and L) to transmit other information.

TABLE 4

| Symbol | b$_2$ b$_1$ b$_0$ | Current |
| --- | --- | --- |
| A | 000 | 0i, 1i, 1i, 2i |
| B | 001 | 0i, 1i, 2i, 1i |
| C | 010 | 0i, 2i, 1i, 1i |
| D | 011 | 1i, 0i, 1i, 2i |
| E | 100 | 1i, 0i, 2i, 1i |
| F | 101 | 1i, 1i, 0i, 2i |
| G | 110 | 1i, 1i, 2i, 0i |
| H | 111 | 1i, 2i, 0i, 1i |
| I |  | 1i, 2i, 1i, 0i |
| J |  | 2i, 0i, 1i, 1i |
| K |  | 2i, 1i, 0i, 1i |
| L |  | 2i, 1i, 1i, 0i |

Another embodiment of a transmission system having four signal conductors may select among four different current values (0i, 1i, 2i, and 3i) instead of three current values as discussed above. By adding a fourth current value, the number of available symbols which may be transmitted over four conductors is doubled to 24. Using the above equation:

$$\text{Permutations} = \frac{n!}{p!} = \frac{4!}{1!} = 24$$

The additional symbols are provided because no signal levels are repeated. In this embodiment, each switch is capable of steering current to one of three different outputs. Thus, each current switch is coupled to three of the four conductors. Table 5 below illustrates the symbols and corresponding current values used in this embodiment.

TABLE 5

| Symbol | Current | Symbol | Current |
| --- | --- | --- | --- |
| A | 0i, 1i, 2i, 3i | M | 2i, 0i, 1i, 3i |
| B | 0i, 1i, 3i, 2i | N | 2i, 0i, 3i, 1i |
| C | 0i, 2i, 1i, 3i | O | 2i, 1i, 0i, 3i |
| D | 0i, 2i, 3i, 1i | P | 2i, 1i, 3i, 0i |
| E | 0i, 3i, 1i, 2i | Q | 2i, 3i, 0i, 1i |
| F | 0i, 3i, 2i, 1i | R | 2i, 3i, 1i, 0i |
| G | 1i, 0i, 2i, 3i | S | 3i, 0i, 1i, 2i |
| H | 1i, 0i, 3i, 2i | T | 3i, 0i, 2i, 1i |
| I | 1i, 2i, 0i, 3i | U | 3i, 1i, 0i, 2i |
| J | 1i, 2i, 3i, 0i | V | 3i, 1i, 2i, 0i |
| K | 1i, 3i, 0i, 2i | W | 3i, 2i, 0i, 1i |
| L | 1i, 3i, 2i, 0i | X | 3i, 2i, 1i, 0i |

FIG. 5 illustrates an embodiment of driver 102 in a system using a transmission line 112 having four signal conductors 112a, 112b, 112c, and 112d. As discussed above, three different signal levels (0i, 1i, and 2i) are provided on the four conductors 112a–112d. Each signal level must be used at least once. Since three signal levels are used on four conductors, one signal level must be used on two conductors. In the embodiment of FIG. 5, four switches 138, 139, 140, and 142 are coupled between various pairs of conductors as shown. Each switch 138–142 is coupled to a current source 144, 146, 148, or 150, and "steers" current generated by the current source toward one of the two conductors coupled to the switch. Each switch 138–142 has a control input (labeled A–D) generated by translator 100 (FIG. 2) that controls the position of the switch.

The transmission systems described above use switches to "steer" current from current sources to the multiple conductors. In alternate embodiments, switches may be used to "steer" voltages onto the conductors. In this embodiment, a voltage driver switches one of three possible voltage values onto its output. As discussed above, a termination voltage (V$_{term}$) is used in conjunction with the current mode drivers. However, this alternate embodiment does not require a termination voltage. Instead, the conductors may be terminated by coupling terminating resistors between each pair of conductors.

FIG. 6 illustrates an embodiment of detector 104 in a system using a transmission line 112 having four signal conductors 112a–112d. The detector shown in FIG. 6 may be used with driver 102 shown in FIG. 5. Detector 104 includes six comparators 152, 154, 156, 158, 160, and 162. Each comparator is coupled between a unique pair of conductors 112a–112d and generates a signal (OUT1–OUT6) based on a comparison of the signal levels on the pair of conductors. The operation of comparators 152–162 is similar to the operation of comparators 130–134 discussed above with respect to FIG. 3B.

Table 6 below illustrates the various codes, control signals, and signal levels at different stages of the transmission system.

TABLE 6

| Code (Source) | Control Signals | Signal Levels | Symbol | Detector Outputs | Code (Dest.) |
| --- | --- | --- | --- | --- | --- |
| 0000 | 0100 | 0i, 1i, 1i, 2i | A | 010x01 | 0000 |
| 0001 | 1011 | 0i, 1i, 2i, 1i | B | 0x0011 | 0001 |
| 0010 | 1110 | 0i, 2i, 1i, 1i | C | 0001x1 | 0010 |
| 0011 | 0200 | 1i, 0i, 1i, 2i | D | x11001 | 0011 |

TABLE 6-continued

| Code (Source) | Control Signals | Signal Levels | Symbol | Detector Outputs | Code (Dest.) |
|---|---|---|---|---|---|
| 0100 | 0210 | 1i, 0i, 2i, 1i | E | 01101x | 0100 |
| 0101 | 2100 | 1i, 1i, 0i, 2i | F | 11x101 | 0101 |
| 0110 | 2111 | 1i, 1i, 2i, 0i | G | 00x010 | 0110 |
| 0111 | 1120 | 1i, 2i, 0i, 1i | H | 10010x | 0111 |
| 1000 | 1121 | 1i, 2i, 1i, 0i | I | x00110 | 1000 |
| 1001 | 2210 | 2i, 0i, 1i, 1i | J | 1100x0 | 1001 |
| 1010 | 2120 | 2i, 1i, 0i, 1i | K | 1x1100 | 1010 |
| 1011 | 2121 | 2i, 1i, 1i, 0i | L | 101x10 | 1011 |

The columns of Table 6 represent example signals generated at different stages of a transmission system having four signal conductors. Symbols A–L correspond to a particular binary code illustrated in column 1. The code in column 1 is generated at the source and received by translator 100. Translator 100 then generates control signals for controlling the position of switches 138–142 shown in FIG. 5. The switch positions are controlled such that the signal levels shown in column 3 are provided on conductors 112a–112d. These signal levels are received by detector 104 and converted into signals as shown in column 5. The control signals are then converted by translator 106 into a destination code corresponding to the input code shown in column 1. Thus, the transmission system correctly reproduces the source information at the destination.

Figure 7A:
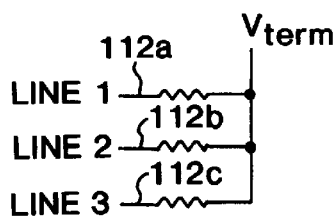
FIGS. 7A–7G illustrate various examples of terminations that may be used with a transmission system.
Figure 7B:
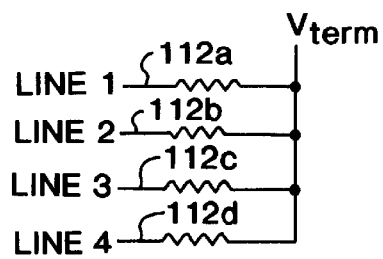
Figure 7C:
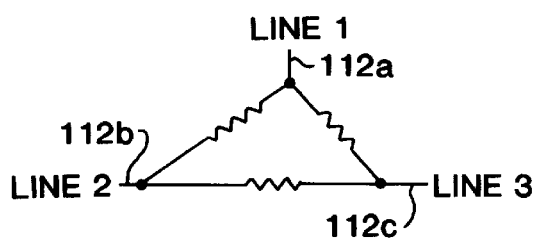
Figure 7D:
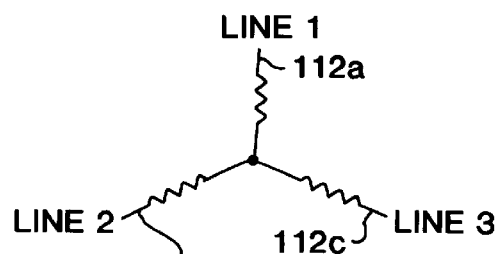
Figure 7E:
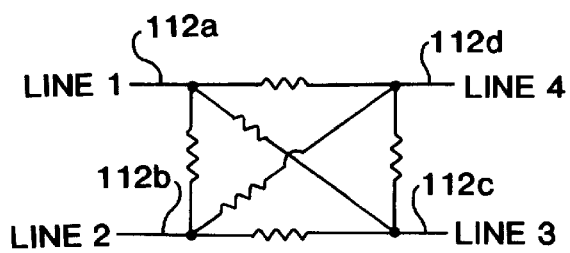
Figure 7F:
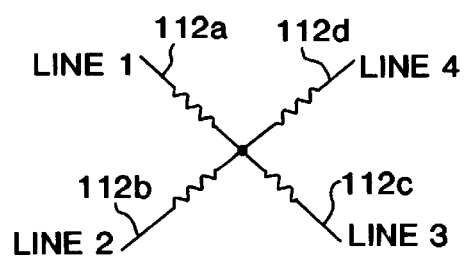
Figure 7G:
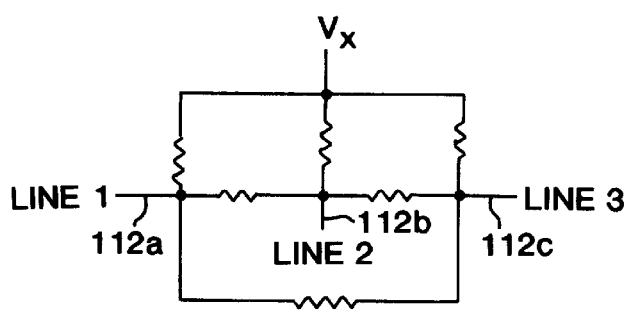

FIGS. 7A–7G illustrate examples of terminations that may be used with the transmission systems described above. FIG. 7A and 7B illustrate one type of termination used to terminate a system having three signal conductors (FIG. 7A) and a system having four signal conductors (FIG. 7B). FIG. 7C may be referred to as a delta network termination where a terminating resistor is coupled between each pair of conductors 112a–112c. FIG. 7D illustrates another termination configuration, referred to as a "Y" network termination. In this configuration, a pair of terminating resistors are coupled between each pair of conductors 112a–112c. FIGS. 7E and 7F are similar to FIGS. 7C and 7D, but configured for use with a transmission system having four conductors 112a–112d. FIG. 7G illustrates a termination that may be used in transmission systems having symbols that propagate at different speeds. Depending on the types of drivers used, a voltage may be applied at $V_x$ to properly terminate the system. For example, in an embodiment utilizing current mode drivers, a voltage is typically applied at $V_x$. However, in another embodiment utilizing voltage mode drivers, $V_x$ is typically coupled to ground.

Those skilled in the art will appreciate that similar terminations may be used in transmission systems having any number of signal conductors. Furthermore, other termination configurations may be used to terminate the transmission systems described herein.

FIG. 8 is a flow diagram illustrating an embodiment of a procedure for defining a set of symbols transmitted by a particular transmission system. At step 170, the number of signal conductors in the transmission line is identified. Example systems having three and four signal conductors are discussed above. However, the teachings of the present invention may be utilized with transmission lines having any number of signal conductors. Step 172 determines the number of signal levels available on each conductor. The number of available signal levels is typically less than or equal to the number of conductors.

At step 174 of FIG. 8, symbols are defined such that each signal level is assigned to at least one conductor and the sum of all signal levels for each symbol is constant. If the number of signal levels is less than the number of conductors, then some of the signal levels are assigned to multiple conductors. At step 176, a particular binary code is assigned to each symbol. For example, in a three-conductor transmission system, binary code 000 may be assigned to symbol A and binary code 001 may be assigned to symbol B. Similar assignments are made for all symbols defined in step 174 above.

FIG. 9 is a flow diagram illustrating an embodiment of a procedure for transmitting information from a source to a destination. At step 180, information is received by the source for transmission to the destination. The information received at step 180 may be in the form of a binary code. At step 182, the procedure determines the symbol associated with the received information (or binary code). Step 184 transmits the received information along the transmission line using the signal levels associated with the symbol. These signal levels are defined using the procedure described above with respect to FIG. 8. At step 186, the signal levels are received at the destination and translated into the associated information.

Figure 10:
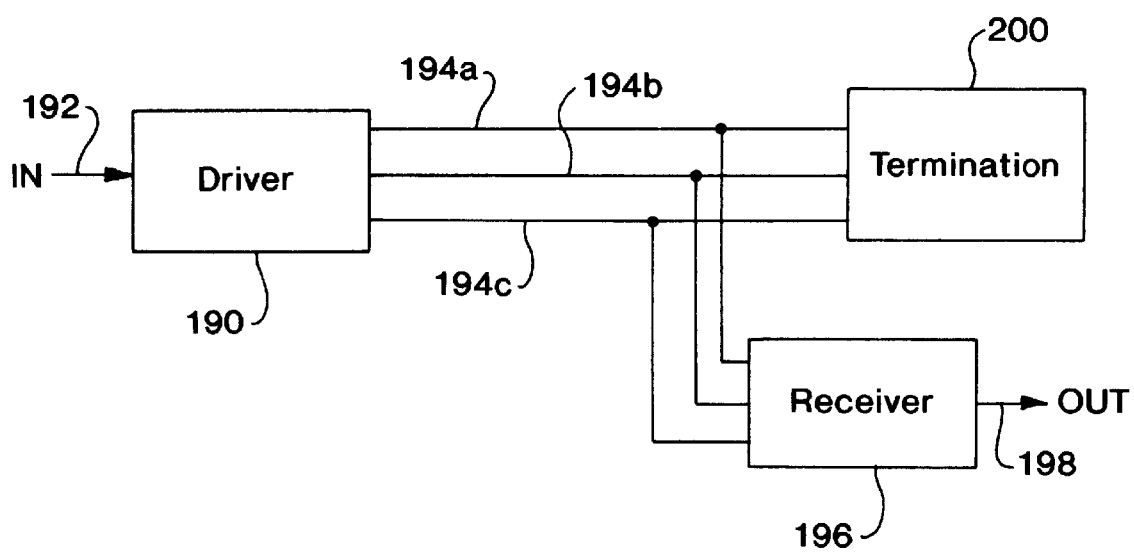
FIG. 10 illustrates an embodiment of the invention using a driver and a receiver to transmit signals across a three-conductor transmission line.

FIG. 10 illustrates an embodiment of the invention using a driver and a receiver to transmit signals across a transmission line having three signal conductors. A driver 190 is coupled to receive data on an input 192 and generate an output signal on three signal conductors 194a–194c. The data on input 192 may be received from a translator or other device similar to those discussed above with respect to FIG. 2. A receiver 196 is coupled to conductors 194a–194c and generates an output signal on line 198 in response to the signal levels on the conductors. A termination network 200 is coupled to transmission lines 194a–194c. The data transmission system of FIG. 10 receives data on input 192, generates appropriate signals corresponding to the input data, and transmits the signals along conductors 194a–194c to receiver 196. Receiver 196 then converts the signals on the conductors to an output signal that corresponds to the input signal.

Specific embodiments of the invention may be implemented such that the multiple conductors are arranged in a physically symmetric manner. This physically symmetric arrangement may reduce distortion caused by dispersion, as discussed below.

A multiconductor transmission line may have certain fundamental (or orthogonal) modes, commonly referred to as eigenvectors. A signal transmitted along the multiple conductors may be analyzed as being comprised of a single eigenvector or a linear combination of two or more eigenvectors. A multiconductor transmission line is said to have multiple eigenvectors, each of which can be studied or analyzed separately from the other eigenvectors because they propagate independently of one another such that there are no interactions or interferences between various eigenvectors as they propagate along the transmission line.

The speed at which a particular symbol propagates along the transmission line depends on the mode being used. Each eigenvector has a corresponding eigenvalue that relates to the propagation speed of the particular eigenvector. In simple situations, the propagation delay ($t_m$) for each eigenvector is defined by the formula:

$$t_m = \sqrt{L_m C_m}$$

Where $L_m$ is the effective inductance and $C_m$ is the effective capacitance for the eigenvector. $L_m$ and $C_m$ are the eigenvalues found as solutions to the capacitance and inductance matrices. $L_m$ and $C_m$ are determined from the result of a diagonalizing transform of the capacitance matrix [C] and the inductance matrix [L], as discussed below. Additional details regarding the calculation of eigenvalues are provided below with respect to FIGS. 11A–11C.

As illustrated by the above formula, the propagation delay ($t_{pd}$) for different eigenvectors may vary if the inductances ($L_m$) and capacitances ($C_m$) are not the same. Since different eigenvectors may have different propagation delays, the eigenvectors may propagate along the conductors at different speeds. These varying propagation speeds may affect signal quality if multiple eigenvectors are combined together in one signal. Additional details regarding signal quality when combining eigenvectors are provided below.

A multiconductor transmission line has a number of eigenvectors (or orthogonal modes) corresponding to the number of signal conductors in the transmission line. For example, a transmission line having three signal conductors may have three different eigenvectors. In a multiconductor transmission line, one of the eigenvectors is referred to as the "even mode eigenvector" and the remaining eigenvectors are referred to as the "odd mode eigenvectors." Even mode eigenvectors may also be referred to as "common mode eigenvectors" and odd mode eigenvectors may also be referred to as "differential mode eigenvectors." For example, a three conductor transmission line includes one common mode eigenvector and two differential mode eigenvectors. Similarly, a four conductor transmission line includes one common mode eigenvector and three differential mode eigenvectors.

The eigenvectors in a multiconductor transmission system represent different signal patterns for propagating a change between symbols along the multiple conductors. The common mode eigenvector is generated when all conductors change from a similar first state to a similar second state simultaneously; e.g., all conductors change from zero volts to one volt simultaneously, or all conductors change from one volt to zero volts simultaneously. As mentioned above, a multiconductor transmission system having n signal conductors will have one common mode eigenvector and n−1 differential mode eigenvectors.

If sufficient symmetry exists between the conductors, then the eigenvectors can be described as follows. The differential mode eigenvectors occur when two or more conductors are changing in opposite directions from one another simultaneously. For example, in a three conductor transmission system, the first differential mode eigenvector may be generated when one conductor is held constant while the remaining two conductors move in opposite directions, but of equal magnitude. For example, a first conductor may be held constant at zero volts, while the second conductor changes from zero volts to positive one volt and the third conductor changes from zero volts to negative one volt. Similarly, a first conductor may be held constant at one volt while the second and third conductors change from one volt to zero volts and from one volt to two volts, respectively.

The second differential mode eigenvector in a three conductor transmission system may be generated when a first conductor moves in one direction by a magnitude twice that of the remaining conductors, which move in an opposite direction. For example, a first conductor may change from zero volts to positive two volts while the remaining two conductors change from zero volts to negative one volt. Similarly, a first conductor may change from one volt to three volts while the remaining two conductors change from one volt to zero volts.

When discussing voltage values and current values, the numbers may be normalized for purposes of explanation. For example, in a particular system, the current on three different conductors may be described as −1, 0, 1. These are normalized values and may actually correspond to actual current values of −20 mA, 0 mA, 20 mA or −40 mA, 0 mA, 40 mA, for example. To remove references to negative currents (or negative voltages), the numbers may be rewritten to include only positive numbers. For example, −1, 0, 1 may be rewritten as 0, 1, 2 (by adding one to each value) which may represent actual current values 0 mA, 20 mA, 40 mA. Similarly, 0, −1, 1 may be rewritten as 1, 0, 2 which actually represents 40 mA, 0 mA, 80 mA. Rather than describing the actual values of the current, simplified (or normalized) numbers are used throughout this specification.

As discussed above, common mode eigenvectors may have multiple conductors changing in the same direction at the same time. In contrast, differential mode eigenvectors may have two or more conductors changing in opposite directions simultaneously. If the differential mode eigenvectors have conductors changing in opposite directions, the current flowing through the multiple conductors is constant. However, the common mode eigenvector for a multiconductor transmission system may have two or more conductors moving in the same direction simultaneously. Therefore, it may be desirable to avoid the use of common mode eigenvectors because they do not generate a constant current flowing through the multiple conductors.

Signaling with constant current (or balanced current) avoids the use of the common mode eigenvector, which has several advantages over transmission systems using unbalanced current flows. A signaling system can be comprised of selected linear combinations of differential mode eigenvectors, such that constant current is maintained. Additionally, a set of symbols can be selected such that the change in current flow on the conductors remains unchanged during the transition period between symbols. Additional details regarding the selection of symbols based on linear combinations of odd mode eigenvectors are provided below.

Constant current flow reduces the electromagnetic radiation interference (EMI) generated by the transmission system. Additionally, by utilizing a constant current in the transmission system, faster data transmission rates are permitted.

Figure 11A:
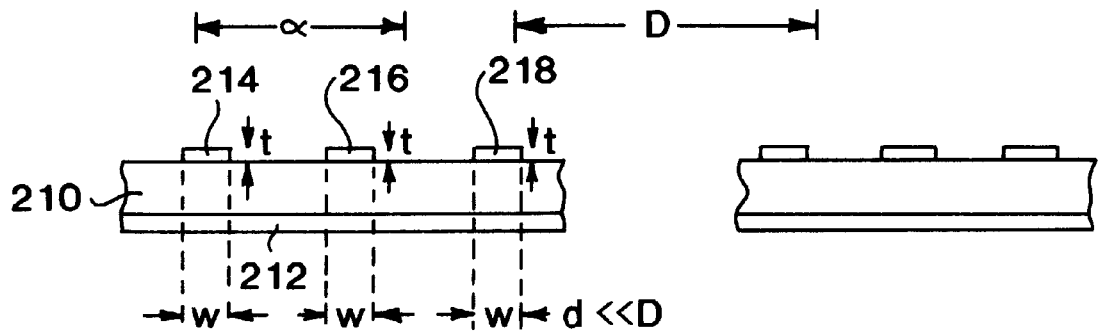
FIG. 11A is a side cross-sectional view of a printed circuit board having multiple conductors.

Calculating eigenvectors and associated eigenvalues for a particular transmission system requires generating a capacitance matrix for the system. As an example, a capacitance matrix will be generated for the three conductor transmission system illustrated in FIG. 11A. FIG. 11A is a side cross-sectional view of a printed circuit board (PCB) including multiple conductors. The PCB includes a substrate 210 having a ground plane 212 disposed on a first surface of the substrate. Three conductors 214, 216, and 218 are disposed on a second surface of substrate 210, opposite ground plane 212. Each conductor 214, 216, and 218 has a thickness "t" and a width "w". The spacing between conductors 214 and 216, and between 216 and 218 is "d". The spacing between conductor 218 and the next group of conductors is "D", such that d<<D. The remaining components of the transmission system (e.g., drivers, receivers, and terminators) are not shown in FIG. 11A.

Figure 11B:
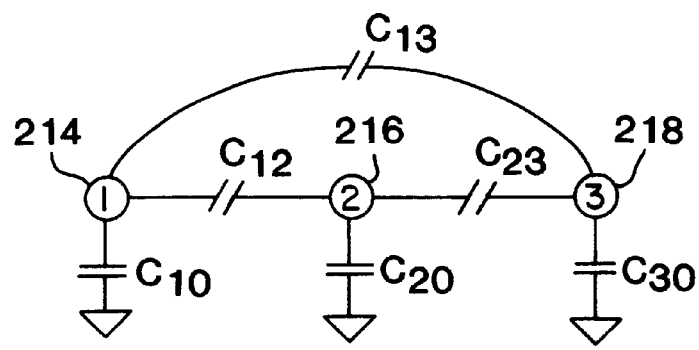
FIGS. 11B and 11C illustrate the capacitances between the multiple conductors shown in FIG. 11A.

As electrical signals propagate along conductors 214–218, capacitances are generated between each pair of conductors and between each conductor and ground plane 212. FIG. 11B illustrates the various capacitances generated. For example, $C_{12}$ represents the capacitance generated between first conductor 214 and second conductor 216. Similarly, $C_{20}$ represents the capacitance generated between second conductor 216 and ground plane 212. The capacitance matrix is generated according to the following formulas:

$$[C]_{ii} = C_{io} + \sum_{j=1}^{n} C_{ij} \quad i \neq j \quad \text{(for elements on the diagonal)}$$

$[C]_{ij} = -C_{ij}$ i≠j (for elements off the diagonal)

Using the example of FIG. 11B, a capacitance matrix is generated according to the above formulas:

$$\begin{bmatrix} C_{11} & C_{12} & C_{13} \\ C_{21} & C_{22} & C_{23} \\ C_{31} & C_{32} & C_{33} \end{bmatrix} = \begin{bmatrix} C_{10}+C_{12}+C_{13} & -C_{12} & -C_{13} \\ -C_{12} & C_{20}+C_{12}+C_{23} & -C_{23} \\ -C_{13} & -C_{23} & C_{30}+C_{23}+C_{13} \end{bmatrix}$$

In a typical system, conductors 214–218 are located an equal distance from ground plane 212. Thus, $C_{10}=C_{20}=C_{30}$. Since the three values are equal, the capacitance will be represented by $C_A$. Additionally, if conductors 214–218 are spaced equally from one another, then $C_{12}=C_{23}$. This capacitance is represented by $C_B$. If $C_{13}$ is renamed $C_C$, then the capacitance matrix may be rewritten as follows:

$$\begin{bmatrix} C_A+C_B+C_C & -C_B & -C_C \\ -C_B & C_A+C_B+C_B & -C_B \\ -C_C & -C_B & C_A+C_B+C_C \end{bmatrix}$$

Figure 11C:
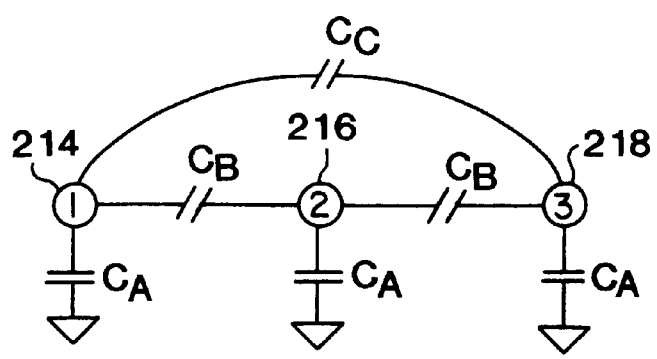

The corresponding circuit diagram is illustrated in FIG. 11C.

Using the appropriate transform, the capacitance matrix can be diagonalized as follows.

$$C_m = T^{-1}[C][T] = \begin{bmatrix} C_A & 0 & 0 \\ & C_A+C_B+2C_C & \\ 0 & 0 & C_A+3C_B \end{bmatrix}$$

The resulting eigenvectors are the columns of T.

$$[T] = \begin{bmatrix} 1 & 1 & 1 \\ 1 & 0 & -2 \\ 1 & -1 & 1 \end{bmatrix}$$

Similarly, the inductance matrix can be diagonalized as follows:

$$L_m = T^{-1}[L][T]$$

As illustrated above, only two differential mode eigenvectors exist for a three signal conductor transmission system. If only "pure" differential mode eigenvectors (e.g., only mode 1 or only mode 2 eigenvectors) are transmitted along the conductors, then the number of possible symbols is limited by the number of differential mode eigenvectors, or scalar multiples thereof. However, by using linear combinations of differential mode eigenvectors, additional symbols may be transmitted while maintaining a balanced or constant current on the conductors. For example, in a three conductor system, the first differential mode eigenvector (1, 0, −1) will be referred to as Mode 1 (M1) and the second differential mode eigenvector (1, −2, 1) will be referred to as Mode 2 (M2). The linear combinations of Mode 1 and Mode 2 eigenvectors are illustrated below in Table 7.

TABLE 7

| Linear Combination | Currents | Adjusted Currents |
|---|---|---|
| −M1 | −1 0 1 | 0 1 2 |
| $-\frac{1}{2}M1 + \frac{1}{2}M2$ | 0 −1 1 | 1 0 2 |
| $\frac{1}{2}M1 + \frac{1}{2}M2$ | 1 −1 0 | 2 0 1 |
| $-\frac{1}{2}M1 - \frac{1}{2}M2$ | −1 1 0 | 0 2 1 |
| $\frac{1}{2}M1 - \frac{1}{2}M2$ | 0 1 −1 | 1 2 0 |
| M1 | 1 0 −1 | 2 1 0 |

The first column of Table 7 illustrates the linear combinations of the two differential mode eigenvectors. The second column of Table 7 illustrates the resulting currents. The third column illustrates normalized currents from column two; i.e., references to negative values are removed by adding one to each value in column two. Each of the linear combinations illustrated in Table 7 generates a constant current flowing through the multiple conductors.

If one of the three eigenvectors is used to transmit a signal across a multiconductor transmission line, the signal will arrive at the output without phase distortion. However, other signal patterns, representing a combination of two or more eigenvectors, may generate a certain amount of distortion in the output signal. Different eigenvectors may propagate at different velocities along the transmission lines. Therefore, phase distortion results when multiple eigenvectors are combined together in one signal because the different portions of the signal (different eigenvectors) propagate at different speeds. Thus, the different eigenvectors within the signal begin to "break apart" from one another such that one portion of the signal arrives at the destination before other portions of the signal. This creates phase distortion because the different portions of the signal (eigenvectors) are not in phase with one another.

Although a certain amount of phase distortion may occur when transmitting combinations of eigenvectors in one signal, in many situations the relatively small phase distortion may be acceptable and will not adversely affect the transmission system. For example, a transmission system having relatively short conductors may be unaffected by a small phase delay of a few picoseconds. However, in a transmission system having long conductors or transmitting data at high frequency, this phase distortion may become significant. In these situations, the multiple conductors may be arranged symmetrically to reduce phase distortion in the transmitted data. Additional details regarding symmetrical arrangement of conductors are provided below with respect to FIGS. 12–14.

Phase distortion may be reduced by arranging some or all of the multiple conductors to result in varying degrees of symmetry. This symmetry of the system determines the magnitude of the difference between the eigenvalues. Thus, even though different eigenvectors are combined together in one signal, they propagate at substantially the same speed and remain in phase at the destination of the transmission system, thereby reducing phase distortion.

This elimination of phase distortion may be accomplished in different manners. Phase distortion is eliminated if all signal conductors are embedded in a homogeneous medium (e.g., FIG. 12 discussed below). Alternatively, if only odd modes are used, phase distortion is eliminated if the odd mode eigenvalues are equal, such as a physically symmetric arrangement of conductors in a non-homogeneous medium (e.g., FIG. 13 discussed below).

As discussed above, FIG. 11A illustrates a side cross-sectional view of a specific arrangement of conductors 214, 216, and 218 located on printed circuit board (PCB) 210. Conductors 214–218 are arranged in a somewhat symmetric pattern. Substrate material 210 may be a dielectric material, for example, the type of material from which PCBs are manufactured. Voltage reference plane 212 may be coupled to ground or a source voltage.

Figure 12:
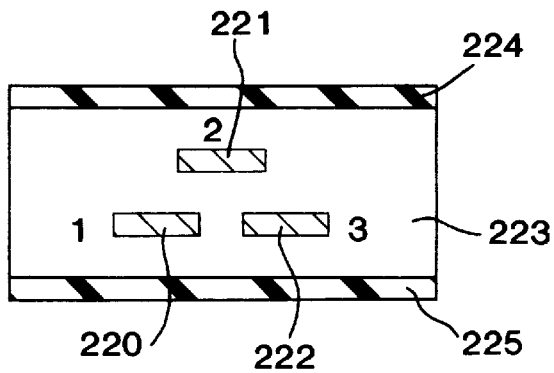
FIG. 12 illustrates a side cross-sectional view of a specific arrangement of conductors in a printed circuit board.
Figure 13:
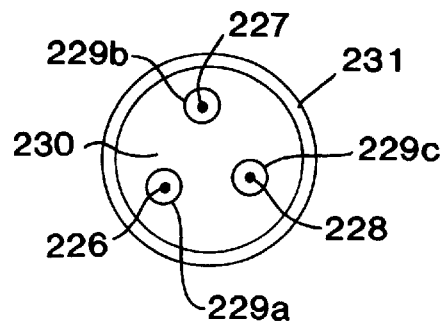
FIG. 13 illustrates a capacitance model for the three-conductor transmission system shown in FIG. 12.

FIG. 12 illustrates a side cross-sectional view of a specific arrangement of conductors 220, 221, and 222 located within a PCB 223 or similar substrate material. Conductors 220–222 are arranged in a symmetric pattern and embedded within PCB 223. In this embodiment, reference planes 224 and 225 are attached to opposite surfaces of PCB 223. Reference planes 224 and 225 may be coupled to ground or a source voltage. The example shown in FIG. 12 eliminates phase distortion because all signal conductors are embedded in a homogeneous medium (i.e., PCB 223). FIG. 13 illustrates a cross-sectional view of an example transmission line having conductors 226, 227, and 228 arranged symmetrically in a non-homogeneous medium. The transmission line illustrated in FIG. 13 may be referred to as "trifilar shielded cable." Each conductor 226–228 is surrounded by an insulator 229a–229c. The conductors and surrounding insulation are located within a medium 230 such as air, and surrounded by a reference conductor 231. Reference conductor 231 may be coupled to ground or a source voltage. The example shown in FIG. 13 eliminates phase distortion because conductors 226–228 are arranged symmetrically in a non-homogeneous medium (the combination of insulation 229a–229c and medium 230).

Figure 14:
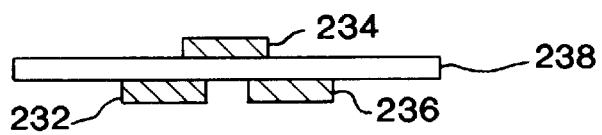
FIG. 14 illustrates an alternate symmetric arrangement of multiple conductors.

FIG. 14 illustrates an alternate symmetric arrangement of multiple conductors in a non-homogeneous medium. In this example, three conductors 232, 234, and 236 are disposed on a dielectric material 238 and arranged as shown. This arrangement provides the mutual inductances and mutual capacitances between conductors 232–236. The example shown in FIG. 14 eliminates phase distortion for the reasons described above with reference to FIG. 13.

FIGS. 12, 13, and 14 illustrate embodiments of multiconductor transmission systems having conductors arranged symmetrically. Other symmetric arrangements include various arrangements of woven, braided or twisted conductors to provide substantially uniform levels of mutual inductance and mutual capacitance between each pair of conductors.

Figure 15A:
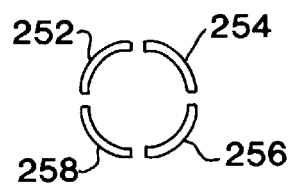
FIGS. 15A and 15B illustrate two embodiments of a symmetrical arrangement of four conductors.
Figure 15B:
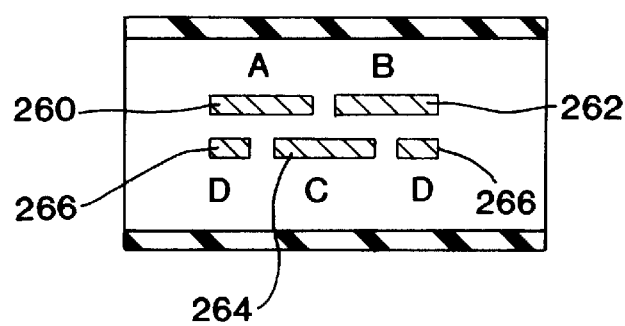

As previously discussed, multiple conductors may be arranged symmetrically to reduce phase distortion in the output signal produced by a multiconductor transmission system. FIGS. 15A and 15B illustrate two symmetrical arrangements of four conductors. FIG. 15A illustrates four conductors 252–258 arranged in a cylindrical manner. FIG. 15B illustrates four conductors 260–266 located within a printed circuit board. This arrangement is similar to that of FIG. 12 above. Conductor 266 is divided into two portions located on both sides of conductor 264. Other symmetrical arrangements (not shown) include weaving or braiding the conductors to provide substantially uniform levels of mutual inductance and mutual capacitance between each pair of conductors.

The present invention may be extended to transmission systems having any number of conductors by using the same procedures and components described above with respect to the three-conductor and four-conductor examples.

From the above description and drawings, it will be understood by those skilled in the art that the particular embodiments shown and described are for purposes of illustration only and are not intended to limit the scope of the invention. Those skilled in the art will recognize that the invention may be embodied in other specific forms without departing from its spirit or essential characteristics. References to details of particular embodiments are not intended to limit the scope of the claims.

What is claimed is:

1. An apparatus for multilevel signaling comprising:
   at least three conductors coupled between a transmission source and a transmission destination;
   a plurality of drivers coupled to said conductors at said transmission source, wherein said drivers generate a signal pattern on said conductors indicating a particular symbol being transmitted from said transmission source to said transmission destination, wherein said signal pattern comprises an odd mode eigenvector.

2. The apparatus of claim 1 wherein said signal pattern is a linear combination of odd mode eigenvectors.

3. The apparatus of claim 1 further including an input logic circuit coupled to said drivers, said input logic circuit generating control signals for controlling said drivers in response to an input signal provided to said input logic circuit.

4. The apparatus of claim 1 further including an output logic circuit coupled to said comparators, said output logic circuit generating an output signal in response to signals generated by said comparators.

5. An apparatus for transmitting data from a source to a destination comprising:
   n conductors coupled between said source and said destination;
   a plurality of drivers coupled to said n conductors at said source; and
   a plurality of comparators coupled to said n conductors at said destination, each comparator having a pair of inputs coupled to two of said n conductors, wherein said comparator inputs are coupled to form an "n choose two" combinatorial matrix.

6. The apparatus of claim 5 wherein said drivers generate a constant current on said conductors.

7. The apparatus of claim 5 wherein each of said plurality of conductors is coupled to a unique pair of conductors.

8. The apparatus of claim 5 wherein said comparators are differential comparators.

9. The apparatus of claim 5 wherein said drivers generate a signal pattern on said conductors, wherein said signal pattern comprises an odd mode eigenvector.

10. The apparatus of claim 9 wherein said signal pattern is a linear combination of odd mode eigenvectors.

11. The apparatus of claim 5 further including an input logic circuit coupled to said drivers, wherein said input logic circuit generates control signals for controlling said drivers in response to an input signal provided to said input logic circuit.

12. The apparatus of claim 5 wherein said n conductors are arranged substantially symmetrically.

13. A method of transmitting and receiving information over a plurality of conductors using a plurality of signal levels, said method comprising the steps of:
   encoding said information into a seguence of symbols wherein each symbol represents a permutation of signal levels on the plurality of conductors;

transmitting said sequence of symbols over said plurality of conductors;

receiving said sequence of symbols transmitted over said plurality of conductors and generating an output signal using an "n choose two" combinatorial matrix; and detecting a difference between the signal levels on pairs of said plurality of conductors and converting said differences into said information.

14. An apparatus for transmitting a sequence of symbols over a multiconductor transmission line having at least three conductors having common and differential mode eigenvector wave propagation, comprising:

means for encoding a data sequence into said sequence of symbols wherein each symbol represents a combination of signal levels on the plurality of conductors; and means for transmitting said sequence of symbols over said multiconductor transmission line, wherein the symbols are transmitted over the multiconductor transmission line using only differential mode eigenvector wave propagation.

15. The apparatus of claim 14 wherein said signal levels are associated with said symbols such that a constant current is maintained on said plurality of conductors.

16. A system comprising:

the apparatus of claim 14; and means for receiving said sequence of symbols transmitted over said plurality of conductors, said receiving means detecting a difference between each pair of conductors and converting said differences into said information.

17. The apparatus of claim 16 wherein said receiving means includes means for generating an output signal using an "n choose two" combinatorial matrix.

18. An apparatus for providing multilevel signaling to a multiconductor transmission line, the apparatus comprising:

at least three outputs each for coupling to a different conductor of the multiconductor line; and at least three drivers each coupled to a unique pair of the outputs, wherein said drivers are configured to generate a signal pattern on said multiconductor transmission line, wherein said signal pattern comprises an odd mode eigenvector.

19. The apparatus of claim 18 wherein said signal pattern comprises a linear combination of odd mode eigenvectors.

20. The apparatus of claim 18 further including an input logic circuit coupled to said drivers, said input logic circuit for controlling said drivers in response to an input signal provided to said input logic circuit.

21. An apparatus for receiving multilevel signaling from a multiconductor transmission line, the apparatus comprising:

at least three inputs each for coupling to a different conductor of the multiconductor transmission line; and at least three comparators each coupled to a unique pair of the inputs, wherein said comparators are coupled to form an "n choose two" combinatorial matrix.

22. The apparatus of claim 21 further comprising an output logic circuit coupled to said comparators, said output logic circuit for generating an output signal in response to signals generated by said comparators.

23. A method of communicating over a multiconductor transmission line, the method comprising:

encoding a data sequence into a sequence of symbols to be transmitted over the multiconductor transmission line, wherein the multiconductor line has at least three conductors, and wherein the multiconductor line has common and differential mode eigenvector wave propagation over the conductors and wherein a symbol consists of a signal level on each conductor, the signal level being one of at least three different signal levels; and transmitting said sequence of symbols over the multiconductor line, wherein the symbols are propagated over the multiconductor line using only differential mode eigenvector wave propagation.

* * * * *